(12) United States Patent
Breeden (10) Patent No.: US 11,112,292 B2
(45) Date of Patent: Sep. 7, 2021

(54) CUSTOM SIGHT LEVEL GAUGE, FIELD ASSEMBLY

(71) Applicant: Frank Chirieleison Breeden, Mandeville, LA (US)

(72) Inventor: Frank Chirieleison Breeden, Mandeville, LA (US)

( * ) Notice: Subject to any disclaimer, the term of this patent is extended or adjusted under 35 U.S.C. 154(b) by 0 days.

(21) Appl. No.: 16/274,230

(22) Filed: Feb. 12, 2019

(65) Prior Publication Data
US 2019/0331517 A1    Oct. 31, 2019

Related U.S. Application Data

(60) Provisional application No. 62/629,316, filed on Feb. 12, 2018.

(51) Int. Cl.
*G01F 23/02*   (2006.01)

(52) U.S. Cl.
CPC .................... *G01F 23/02* (2013.01)

(58) Field of Classification Search
CPC ..................................................... G01F 23/02
See application file for complete search history.

(56) References Cited

U.S. PATENT DOCUMENTS

| | | | |
|---|---|---|---|
| 5,323,653 A * | 6/1994 | Gruett | G01K 13/02 |
| | | | 374/E13.006 |
| 5,442,959 A | 8/1995 | Mills | |
| 6,857,315 B1 | 2/2005 | Mills | |

* cited by examiner

*Primary Examiner* — Paul M. West
(74) *Attorney, Agent, or Firm* — Norton IP Law Firm LLC; Taylor M. Norton (57) ABSTRACT

The present disclosure provides for an armored sight level gauge field assembly for placement between fittings to show liquid level, including an elongated cylindrical transparent sight tube shield and a sight tube extending through the sight tube shield. First and second receiver plates define passages for the sight tube to extend therethrough, each receiver plate also sealing the shield. A U-shaped guard is removably connected to each receiver plate and provides a structural protective enclosure, substantially enclosing the sight tube shield. First and second connector plates attach to each receiver plate, and each connector plate defines an opening to receive ends of the sight tube for fluid communication between the sight tube and the fittings, each connector plate comprising a nozzle extending therefrom, opposite said opening, in coaxial alignment with the sight tube. Each nozzle is positionable between and removable from the spaced apart fittings.

11 Claims, 10 Drawing Sheets

SECTION D-D
SCALE 1 : 1

SECTION C-C
SCALE 1:1

CUSTOM SIGHT LEVEL GAUGE, FIELD ASSEMBLY

CROSS REFERENCE TO RELATED APPLICATIONS

This application claims the benefit of U.S. Provisional Application No. 62/629,316, filed on Feb. 12, 2018, which is incorporated herein by reference.

BACKGROUND OF THE INVENTION

Field of the Invention

The present invention generally relates to gauges for depicting the liquid level of a containment vessel and more particularly relates to a novel mechanical, armored, sight level gauge that can be field assembled or factory assembled.

Description of the Related Art

It has been a long standing practice to use elongated tubular members connected to containment vessels to show liquid levels therein. The use of these elongated tubular members connected to containment vessels are commonly used due to the inexpensiveness, simplicity, and reliability of these devices since they typically do not rely upon electrical or mechanical mechanism to indicate the level of liquid.

Over the years, various devices have been made to assist people with the ability to check fluid levels in a containment vessel. However, such commonly known devices present the risk and danger of breakage of sight tubes, as said tubes tend to be made of glass or plastic, which may be damaged or broken through contact with various objects. Such objects which may cause breakage of sight tubes include broom handles, tools, objects blown by the wind, etc. A broken sight tube can be a serious problem if the contents of the containment vessel are hazardous. As sight tubes are often used for measuring the levels of hazardous materials, such as combustible liquids within a containment vessel.

Another common problem with currently available sight tubes is the restriction of only being able to check these gauges from certain fixed angles, which requires more effort by the person using the device and increases the time required to check the liquid levels of containment vessels. There is a need for a protected, efficient, and easy to use sight gauge for users to safely, efficiently, and effectively check the liquid levels of containment vessels out in the field, via the ability to field assemble a device to a containment vessel's required center to center dimension.

A conventional apparatus for indicating fluid levels in a containment vessel is provided in U.S. Pat. No. 5,442,959 issued to Mills, which discloses a sight gauge placed between two spaced apart compression type fittings connected to a containment vessel depicting the level of liquid therein. The sight gauge contains an elongated transparent tube shield and a slightly longer elongated transparent sight tube within the sight tube shield. Said sight tube is received between telescopic upper and lower connection plates with the sight tube shield held between the connection plates. The sight tube is connected to upper and lower nozzle members through elastomeric O-rings positioned between the connection plates and the nozzle members. The nozzle members are secured to the compression plates with bolts, which squeeze the O-rings against the sight tube, resulting in the retention and support of the tube shield. These nozzle members have elongated tubular portions which are designed to be received by compression fittings. As provided therein, such a device cannot be field assembled to fit the required center to center dimensions of a containment vessel. Nor can this device provide adequate shielding from impact. Such devices are complex in construction, limited in use with multiple sizes of containment vessel and inconvenient to use.

U.S. Pat. No. 6,857,315 also issued to Mills discloses an armored sight gauge assembly containing a permanently connected U-shaped main body housing a sight tube between two fittings to show a liquid level of a containment vessel. The main body has a removable transparent sight tube shield. The internal assembly connected to the sight tube contains a valve assembly and ball check shutoff within the internal portion of each fitting. Each fitting contains removable misalignment unions. However, as provided therein, the U-shaped main body is permanently fixed in position and blocks light from reaching the sight tube and therefore results in difficulty for the person determining the level of liquid in a containment vessel via the enclosed sight tube.

While these units may be suitable for the particular purpose employed, they would not be as suitable for the purposes of the present invention as disclosed hereafter.

Accordingly, there is a need for a protected, efficient, and easy to use sight gauge for users to safely, efficiently, and effectively check the liquid levels of containment vessels out in the field, via the ability to field assemble a device to a containment vessel's required center to center dimension.

As disclosed in this application, the inventor has discovered novel and unique devices and methods for efficient and safe determination of liquid levels within containment vessels, which exhibit superlative properties without being dependent on heavy, immobile, expensive or complex components.

Embodiments of the present invention provide for devices and methods and disclosed herein and as defined in the annexed claims which provide for improved determinations of liquid levels within containment vessels features in order to efficiently field assemble a sight level gauge while preventing breakage of the sight tube and enabling 360 degree rotation of the sight tube housing.

SUMMARY OF THE INVENTION

It is one prospect of the present invention to provide one or more novel devices of simple but effective construction which can be applied to many environments to efficiently and effectively depict the liquid levels of containment vessels.

The following presents a simplified summary of the present disclosure in a simplified form as a prelude to the more detailed description that is presented herein.

Therefore, in accordance with embodiments of the invention, there is provided an armored sight level gauge field assembly for placement between first and second spaced apart fittings to show liquid level. The gauge includes an elongated cylindrical transparent sight tube shield having a first end opposite a second end. A sight tube having a first end opposite a second end extends through the sight tube shield. A first receiver plate and a second receiver plate each have a body having a rectangular exterior surface adapted for rigid connection to a U-shaped guard member. Each receiver plate defines a passage wherein the sight tube extends through the passage. Each receiver plate further sealably receives respective first and second ends of the shield, serving to seal an interior of the shield. An elongated U-shaped guard member has a first end removably connected to the first receiver plate and a second end removably connected to the second receiver plate. The guard member provides a structural protective enclosure substantially enclosing the sight tube shield and the sight tube, serving to structurally protect and support the shield. The sight level gauge further includes a first connector plate and a second connector plate, each connector plate defining an opening to respectively receive and secure the first and second ends of the sight tube for fluid communication between said sight tube and the fittings. Each connector plate includes a nozzle extending therefrom, opposite the opening, in coaxial alignment with the sight tube, each nozzle positionable between and removable from the spaced apart fittings.

In one embodiment, the armored sight level gauge includes an O-ring positioned around a cylindrical portion of the first receiver plate, wherein the cylindrical portion of the first receiver plate is configured to fit within the interior passage of the sight tube shield and compress the O-ring between the cylindrical portion of the first connector plate and the interior passage of the sight tube shield, creating a seal.

In yet another embodiment, the armored sight level gauge includes at least one O-ring positioned around the first end of the sight tube, wherein the at least one O-ring is positioned to compress and form a seal between the first connector plate and the first receiver plate upon the attachment of the first connector plate and the first receiver plate.

In still a further embodiment, the armored sight level gauge includes a ferrule disposed on an end of a nozzle of the connector, wherein the nozzle is configured for insertion into a valve to form a seal.

In one embodiment, the armored sight level gauge includes a first valve with an integral ball check and a second valve with an integral ball check, wherein the first valve is configured to attach to the first connector plate and the second valve is configured to attach to the second connector plate, wherein fluid communication is enabled with the interior passage of the sight tube.

In yet another embodiment, the armored sight level gauge includes a first needle valve with an integral ball check and a second needle valve with an integral ball check, wherein the first needle valve is configured to attach to the first connector plate and the second needle valve is configured to attach to the second connector plate, wherein fluid communication is enabled with the interior passage of the sight tube.

In one embodiment, the elongated guard member has perforations to allow light into the gauge.

In yet another embodiment, there is provided an armored sight level gauge field assembly for placement between first and second spaced apart fittings to show liquid level. The gauge includes an elongated cylindrical transparent sight tube shield having a first end opposite a second end. A sight tube having a first end opposite a second end extends through the sight tube shield. A first receiver plate and a second receiver plate each have a body having a rectangular exterior surface adapted for rigid connection to a U-shaped guard member. Each receiver plate defines a passage wherein the sight tube extends through the passage. Each receiver plate further sealably receives respective first and second ends of the shield, serving to seal an interior of the shield. An elongated guard member has a first end removably connected to the first receiver plate and a second end removably connected to the second receiver plate. The guard member provides a structural protective enclosure substantially enclosing the sight tube shield and the sight tube, serving to structurally protect and support the shield. The sight level gauge further includes a first connector plate and a second connector plate, each connector plate defining an opening to respectively receive and secure the first and second ends of the sight tube for fluid communication between said sight tube and the fittings. Each connector plate includes a nozzle extending therefrom, opposite the opening, in coaxial alignment with the sight tube, each nozzle positionable between and removable from the spaced apart fittings.

In one embodiment, the elongated guard member of the armored sight level gauge is C-shaped.

In yet another embodiment, there is provided an armored sight level gauge field assembly for placement between first and second spaced apart fittings to show liquid level. The gauge includes a first elongated cylindrical transparent sight tube shield and a second elongated cylindrical transparent sight tube shield, each shield having a first end opposite a second end. First and second sight tubes each have a first end opposite a second end and extend through the sight tube shields. An inter-connector block has a first block end opposite a second block end, each block end having a rectangular exterior surface adapted for rigid connection to a U-shaped guard member, the first block end defining a first opening therein to receive and secure the second end of the first sight tube, the second block end defining a second opening therein to receive and secure the first end of the second sight tube thereby enabling fluid communication between the first and second sight tubes. The first block end sealably receives the second end of the first shield and the second block end sealably receives the first end of the second shield, serving to seal the respective ends of each shield. The gauge further includes a first receiver plate and a second receiver plate, each receiver plate having a body with a rectangular exterior surface adapted for rigid connection to a U-shaped guard member. Each receiver plate defines a passage wherein the sight tubes extends through the passage. The first receiver plate sealably receives first end of the first shield and the second receiver plate sealably receives the the second end of the second shield, serving to seal the respective ends of each shield. The gauge further includes a first elongated U-shaped guard member and a second elongated U-shaped guard member, the first guard member having a first end removably connected to the first receiver plate and a second end removably connected to the inter-connector block, the second guard member having a first end removably connected to the inter-connector block and a second end removably connected to the second receiver plate, the guard members providing a structural protective enclosure substantially enclosing the sight tube shields and the sight tube, the guard members serving to structurally protect and support the shield. A first connector plate and a second connector plate are included, the first connector plate defining an opening therein to respectively receive and secure the first end of the first sight tube, the second connector plate defining an opening therein to respectively receive and secure the second end of the second sight tube for fluid communication between the sight tubes and the fittings, each connector plate comprising a nozzle extending therefrom, opposite said opening, in coaxial alignment with the sight tubes, each nozzle positionable between and removable from the spaced apart fittings.

In on embodiment, the armored sight level gauge has a single sight tube extending from the first connector plate to the second connector plate, passing through the inter-connector block.

These and other features, aspects, and advantages of the present invention will become better understood with reference to the following description and appended claims.

BRIEF DESCRIPTION OF THE DRAWINGS

Illustrative embodiments of the present invention are described herein with reference to the accompanying drawings, in which like numerals throughout the figures identify substantially similar components, in which.

DETAILED DESCRIPTION

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

As used herein, "axis" means a real or imaginary straight line about which a three-dimensional body is symmetrical. A "vertical axis" means an axis perpendicular to the ground (or put another way, an axis extending upwardly and downwardly). A "horizontal axis" means an axis parallel to the ground.

As used herein, homogeneous is defined as the same in all locations, and a homogeneous material is a material of uniform composition throughout that cannot be mechanically separated into different materials. Examples of "homogeneous materials" are certain types of plastics, ceramics, glass, metals, alloys, paper, board, resins, high-density polyethylene and rubber.

Figure 1:
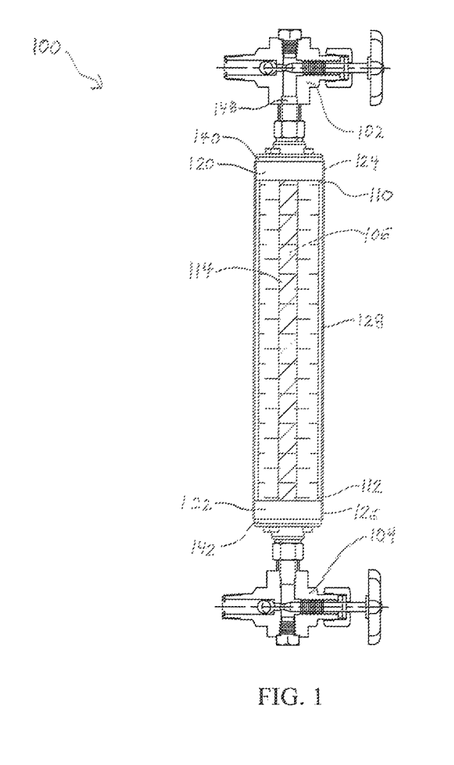
FIG. 1 is a front elevation view of a novel mechanical, armored, sight level gauge field assembly, in accordance with embodiments of the present invention.
Figures 63, 66:
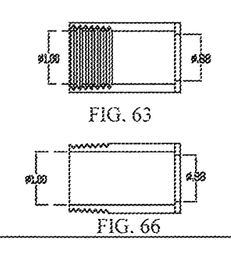
Figure 64:
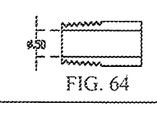
Figure 65:
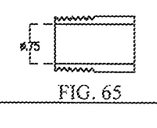

Referring initially to FIGS. 1-66, the basic constructional details and principles of operation of embodiments of an armored sight level gauge field assembly 100 according to a embodiments of the present invention will be discussed.

Figure 2:
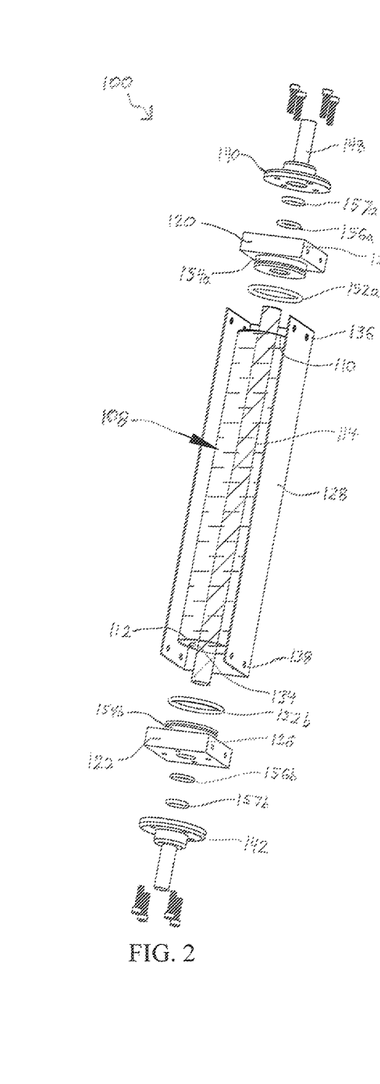
FIG. 2 is an exploded right perspective view thereof.

As shown in FIGS. 1 and 2, in a preferred embodiment, the armored sight level gauge field assembly 100 is preferably placed between first and second spaced apart fittings 102 and 104 to show liquid level 106. Preferably, the fittings 102 and 104 are are needle valves with a ball check. The fittings 102 and 104 are preferably fabricated with 16 gauge 316 stainless steel. The gauge 100 includes an elongated cylindrical transparent sight tube shield 108 having a first end 110 opposite a second end 112. Preferably, the sight tube shield 108 is 2"×⅛" polycarbonate tubing.

As illustrated, a sight tube 114 having a first end 116 opposite a second end 118 extends through the sight tube shield 108. Preferably, the sight tube 114 is ⅝" high pressure tubular glass. A first receiver plate 120 and a second receiver 122 plate each have a body having a respective rectangular exterior surface 124 and 126 adapted for rigid connection to a U-shaped guard member 128. Each receiver plate 120 and 122 define respective passages 130 and 132 wherein the sight tube 114 extends through the passages 130 and 132. Each receiver plate 120 and 122 further sealably receives respective first and second ends 110 and 112 of the shield 108, serving to seal an interior 134 of the shield 108. Preferably, the receiver plates 120 and 122 are fabricated with 316 stainless steel. Exemplary dimensions of embodiments of the receiver plates 120 and 122 are illustrated in FIGS. 8-9, 19-20, and 25-26.

Preferably, an elongated U-shaped guard member 128 has a first end 136 removably connected to the first receiver plate 120 and a second end 138 removably connected to the second receiver plate 122. When the first end 136 is connected to the first receiver plate 120, a rigid connection is provided between the guard member 128 and the first receiver plate 120. Similarly, when the second end 138 is connected to the second receiver plate 122, a rigid connection is provided between the guard member 128 and the second receiver plate 122. The guard member 128 provides a structural protective enclosure substantially enclosing the sight tube shield 108 and the sight tube 114, serving to structurally protect and support the shield 108 and the tube 114. Preferably, the U-shaped member 128 is fabricated with 16 gauge 316 stainless steel.

In a preferred embodiment, the sight level gauge 100 further includes a first connector plate 140 and a second connector plate 142, each connector plate defining openings 144 and 146 to respectively receive and secure the first and second ends 116 and 118 of the sight tube 114 for fluid communication between the sight tube 114 and the fittings 102 and 104. Each connector plate 140 and 142 includes a respective nozzle 148 and 150 extending therefrom, opposite the respective openings 144 and 146, in coaxial alignment with the sight tube 114, each nozzle 148 and 150 positionable between and removable from the spaced apart fittings 102 and 104. Preferably, the connector plates 140 and 142 are fabricated with 316 stainless steel. Preferably, the respective nozzle 148 and 150 is ½ inch tubing fabricated with 316 stainless steel and extends into the respective valve fitting 102 and 104. Exemplary dimensions of embodiments of the receiver plate 120 are illustrated in FIGS. 10-13, 21-24, and 29-30. Preferably, the receiver plates 120 and 122 attach to the connector plates 140 and 142 by 10-32×¾" socket head screws 196. Preferably, the guard 128 rigidly attaches to the receiver plates 120 and 122 by socket head screws 196.

In one embodiment, the armored sight level gauge 100 includes at least one O-ring 152a positioned around a cylindrical portion 154 of the first receiver plate 120, wherein the cylindrical portion 154 of the first receiver plate 120 is configured to tightly fit within the interior passage 134 of the sight tube shield 108 and compress the O-ring 152a between the cylindrical portion 154a of the first receiver plate 120 and the interior passage 134 of the sight tube shield 108, creating a seal at the first end 110 of the sight tube shield 108. In one embodiment, the armored sight level gauge 100 includes at least one O-ring 152b positioned around a cylindrical portion 154b of the second receiver plate 122, wherein the cylindrical portion 154b of the second receiver plate 122 is configured to tightly fit within the interior passage 134 of the sight tube shield 108 and compress the O-ring 152b between the cylindrical portion 154b of the second receiver plate 120 and the interior passage 134 of the sight tube shield 108, creating a seal at the second end 112 of the sight tube shield 108. Preferably, the O-rings 152a, 152b are 223-V-, 1.625"×0.139" or 224-V-, 1.625"×0.139".

In yet another embodiment, the armored sight level gauge 100 includes at least one O-ring 156a positioned around the first end 116 of the sight tube 114, wherein the at least one O-ring 156a is positioned to compress and form a seal around the sight tube 114 between the first connector plate 140 and the first receiver plate 120 upon the attachment of the first connector plate 140 to the first receiver plate 120. In yet another embodiment, the armored sight level gauge 100 includes at least one O-ring 156b positioned around the second end 118 of the sight tube 114, wherein the at least one O-ring 156b is positioned to compress and form a seal around the sight tube 114 between the second connector plate 142 and the second receiver plate 122 upon the attachment of the second connector plate 142 to the second receiver plate 122. Preferably, the one or more O-rings 156a, 156b are preferably 206-V-, 0.5 inch×0.139" and/or 114-V-, 0.625"×0.103", for example. Preferably, a cushion O-Ring 157a is disposed within the first connector plate 140, at the first end 116 of the sight tube 114. Preferably, a cushion O-Ring 157b is disposed within the second connector plate 142, at the second end 118 of the sight tube 114. The O-Rings 157a, 157b provide an additional seal at each of the ends 116, 118 of the sight tube 114.

In still a further embodiment, the nozzle 148, 150 of the respective connectors plates 140, 142 of the armored sight level gauge 100 extends through the high pressure union fitting 159 and into respective fittings 102, 104. The high pressure union fitting 159 includes a compression nut 160 which engages at least one ferrule 158 to squeeze against the respective nozzle 148, 150 to form a tight tube fitting seal.

Figure 40:
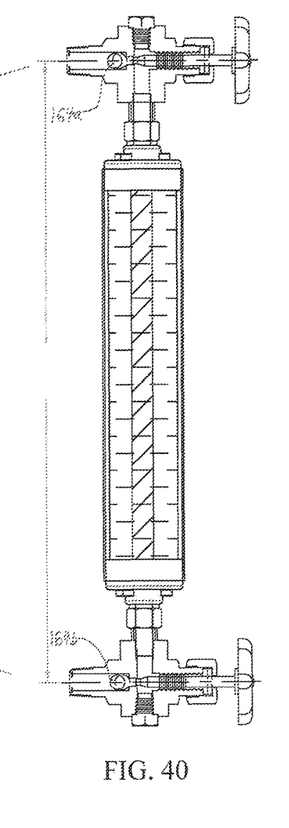
FIG. 40 is a front elevation view of a novel mechanical, armored, sight level gauge field assembly, in accordance with embodiments of the present invention.
Figure 41:
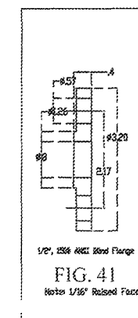
FIGS. 41-44 are cross sectional elevation views of exemplary flanged connections, in accordance with embodiments of the invention.
Figure 42:
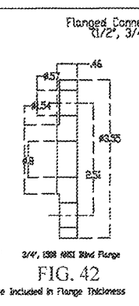
Figure 43:
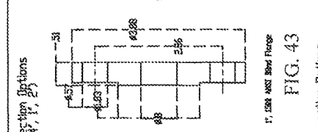
Figure 44:
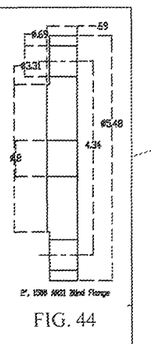
Figure 45:
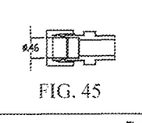
FIGS. 45-46 are cross sectional elevation views of exemplary high pressure union tube fitting connections, in accordance with embodiments of the invention.
Figure 46:
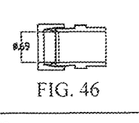
Figure 47:
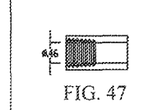
FIGS. 47-52 are cross sectional elevation views of exemplary threaded connections for the fittings, in accordance with embodiments of the invention.
Figure 48:
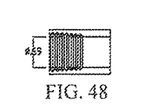
Figure 49:
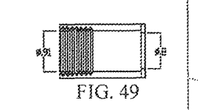
Figure 50:
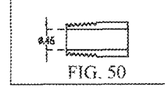
Figure 51:
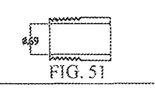
Figure 52:
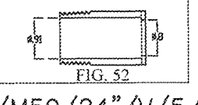
Figure 53:
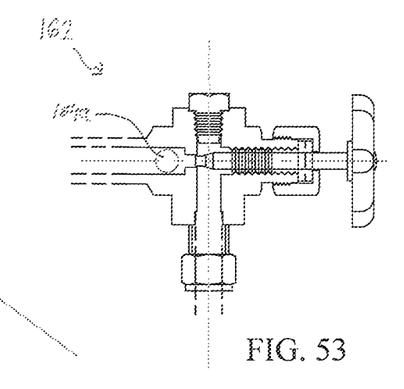
FIG. 53 is a cross sectional elevation view of an exemplary embodiment of a top needle valve with ball check assembly, in accordance with embodiments of the invention.
Figure 54:
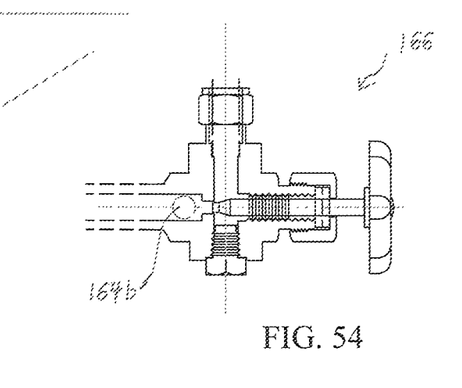
FIG. 54 is a cross sectional elevation view of an exemplary embodiment of a bottom needle valve with ball check assembly, in accordance with embodiments of the invention.
Figure 55:
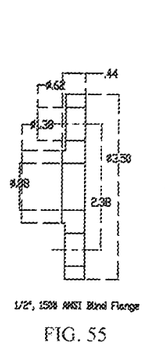
FIGS. 55-58 are cross sectional elevation views of exemplary flanged connections, in accordance with embodiments of the invention.
Figure 56:
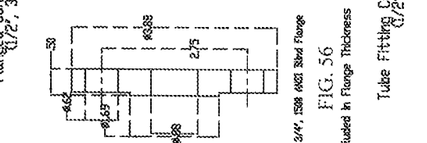
Figure 57:
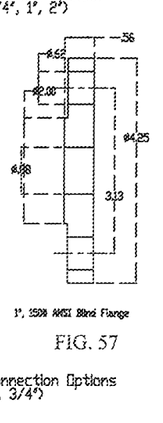
Figure 58:
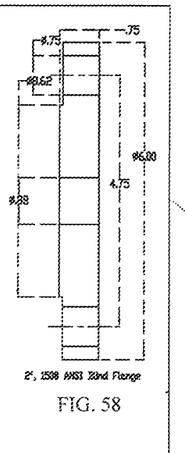
Figure 59:
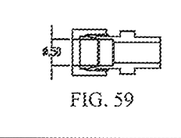
FIGS. 59-60 are cross sectional elevation views of exemplary high pressure union tube fitting connections, in accordance with embodiments of the invention.
Figure 60:
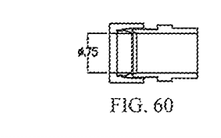
Figure 61:
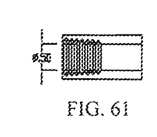
FIGS. 61-66 are cross sectional elevation views of exemplary threaded connections for the fittings, in accordance with embodiments of the invention.
Figure 62:
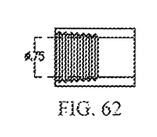

In one embodiment, the armored sight level gauge assembly 100 is removably connected to a fitting 102 comprising a first needle valve 162 having an integral ball check 164a, and the armored sight level gauge assembly 100 is connected to a second needle valve 166 having an integral ball check 164b. The first valve 162 is configured to removably attach to the nozzle 148 of the first connector plate 140, and the second valve 166 is configured to removably attach to the the nozzle 150 of the second connector plate 142, wherein fluid communication is enabled with the interior passage 134 of the sight tube 114, as illustrated in FIGS. 1 and 40.

In yet another embodiment, the armored sight level gauge assembly 100 includes a first needle valve 162 with an integral ball check 164 and a second needle valve 166 with an integral ball check 166, wherein the first needle valve 164 is configured to attach to the first connector plate 140, and the second needle valve 166 is configured to attach to the second connector plate 142, wherein fluid communication is enabled with the interior passage of the sight tube 114. FIGS. 54-66 illustrate exemplary valve connection options, in accordance with embodiments of the invention.

In one embodiment, the elongated guard member 128 has perforations 168 to allow light into the gauge 100.

In yet another embodiment, the armored sight level gauge field assembly 100 is preferably placed between first and second spaced apart fittings 102 and 104 to show liquid level 106. The gauge 100 includes an elongated cylindrical transparent sight tube shield 108 having a first end 110 opposite a second end 112. A sight tube 114 having a first end 116 opposite a second end 118 extends through the sight tube shield 108. A first receiver plate 120 and a second receiver 122 plate each have a body comprising a respective rectangular exterior surface 124 and 126 that is adapted for rigid connection to an elongated guard member 128. Each receiver plate 120 and 122 defines respective passages 130 and 132 wherein the sight tube 114 extends through the passages 130 and 132. Each receiver plate 120 and 122 further sealably receives respective first and second ends 110 and 112 of the shield 108, serving to seal an interior 134 of the shield 108.

Preferably, an elongated guard member 128 has a first end 136 removably connected to the first receiver plate 120 and a second end 138 removably connected to the second receiver plate 122. In one embodiment, the elongated guard member of the armored sight level gauge is C-shaped. The guard member 128 provides a structural protective enclosure substantially enclosing the sight tube shield 108 and the sight tube 114, serving to structurally protect and support the shield 108. The sight level gauge 100 further includes a first connector plate 140 and a second connector plate 142, each connector plate defining openings 144 and 146 to respectively receive and secure the first and second ends 116 and 118 of the sight tube 114 for fluid communication between the sight tube 114 and the fittings 102 and 104. Preferably, each connector plate 140 and 142 includes a respective nozzle 148 and 150 extending therefrom, opposite the respective openings 144 and 146, in coaxial alignment with the sight tube 114, each nozzle 148 and 150 positionable between and removable from the spaced apart fittings 102 and 104.

Figures 3, 4, 6, 10, 11, 12, 13:
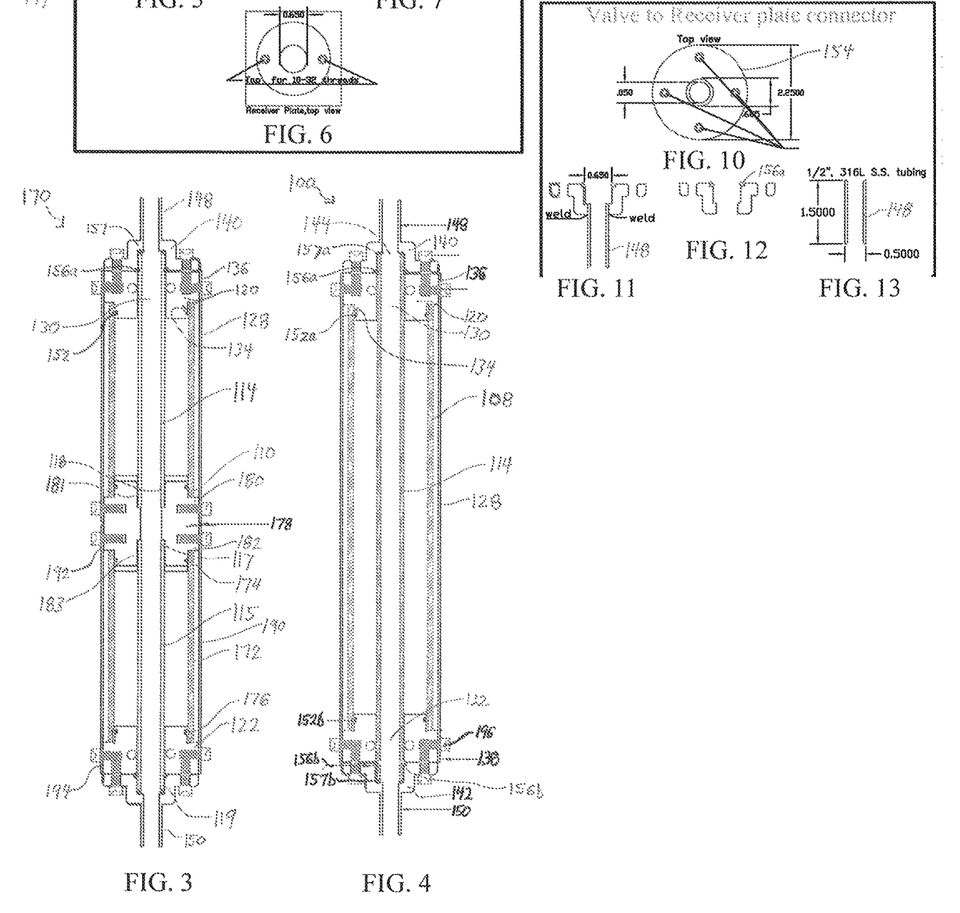
FIG. 3 is a cross sectional view of the gauge for use in embodiments of greater than 8 feet, in accordance with embodiments of the invention.
FIG. 4 is a cross sectional view of the gauge for use in embodiments of up to 8 feet, in accordance with embodiments of the invention.
FIG. 6 is a top view of an exemplary embodiment of an inter-connector block, in accordance with embodiments of the invention.
FIG. 10 is a top view of an exemplary embodiment of a connector plate, in accordance with embodiments of the invention.
FIG. 11 is a cross sectional elevation view of an exemplary embodiment of a connector plate, including a connector plate nozzle, in accordance with embodiments of the invention.
FIG. 12 is a cross sectional elevation view of an exemplary embodiment of a connector plate, in accordance with embodiments of the invention.
FIG. 13 is a cross sectional elevation view of an exemplary embodiment of a connector plate nozzle, in accordance with embodiments of the invention.
Figure 5:
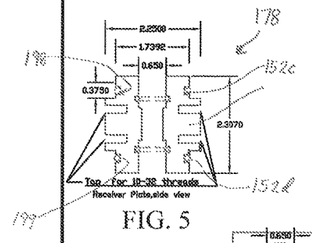
FIG. 5 is a cross sectional elevation view of an exemplary embodiment of an inter-connector block, in accordance with embodiments of the invention.
Figure 7:
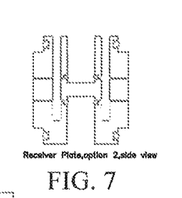
FIG. 7 is a cross sectional elevation view of an exemplary embodiment of an inter-connector block, in accordance with embodiments of the invention.
Figure 8:
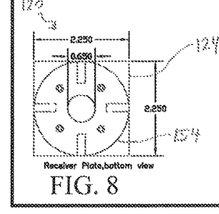
FIG. 8 is a bottom view of an exemplary embodiment of a receiver plate, in accordance with embodiments of the invention.
Figure 9:
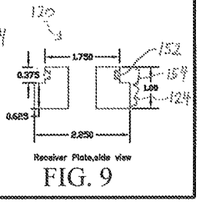
FIG. 9 is a cross sectional elevation view of an exemplary embodiment of a receiver plate, in accordance with embodiments of the invention.
Figure 14:
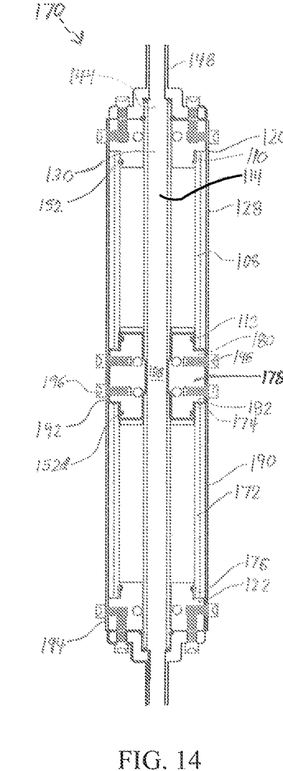
FIG. 14 is a cross sectional view of the gauge for use in embodiments of greater than 8 feet, in accordance with embodiments of the invention.

In yet another embodiment, there is provided an armored sight level gauge field assembly 170 for placement between first and second spaced apart fittings 102 and 104 to show liquid level 106, as illustrated in FIGS. 3 and 14.

Figure 15:
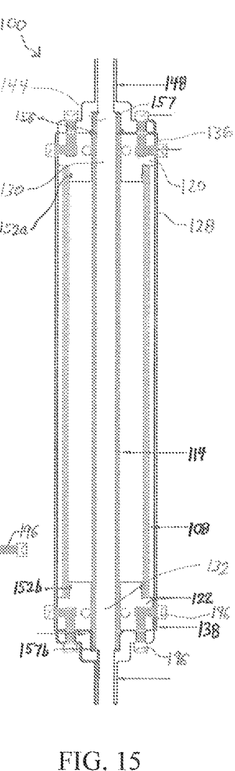
FIG. 15 is a cross sectional view of the gauge for use in embodiments of up to 8 feet, in accordance with embodiments of the invention.
Figure 16:
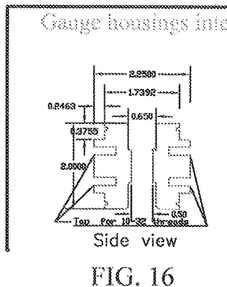
FIG. 16 is a cross sectional elevation view of an exemplary embodiment of an inter-connector block, in accordance with embodiments of the invention.
Figure 17:
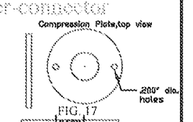
FIG. 17 is a top view of a compression plate, in accordance with embodiments of the invention.
Figure 18:
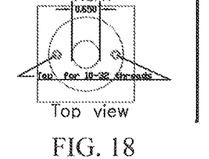
FIG. 18 is a top view of an exemplary embodiment of an inter-connector block, in accordance with embodiments of the invention.
Figure 19:
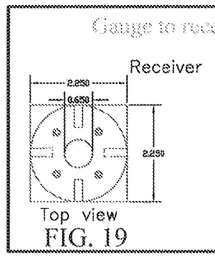
FIG. 19 is a bottom view of an exemplary embodiment of a receiver plate, in accordance with embodiments of the invention.
Figure 20:
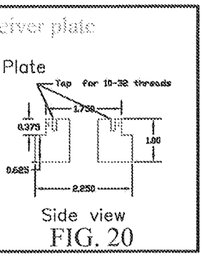
FIG. 20 is a cross sectional elevation view of an exemplary embodiment of a receiver plate, in accordance with embodiments of the invention.
Figure 21:
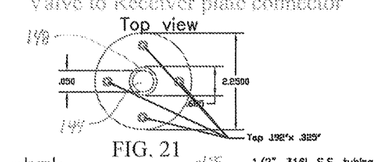
FIG. 21 is a top view of an exemplary embodiment of a connector plate, in accordance with embodiments of the invention.
Figure 22:
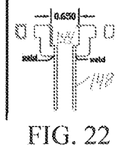
FIG. 22 is a cross sectional elevation view of an exemplary embodiment of a connector plate, including a connector plate nozzle, in accordance with embodiments of the invention.
Figure 23:
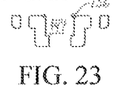
FIG. 23 is a cross sectional elevation view of an exemplary embodiment of a connector plate, in accordance with embodiments of the invention.
Figure 24:
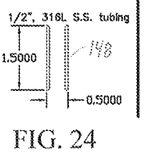
FIG. 24 is a cross sectional elevation view of an exemplary embodiment of a connector plate nozzle, in accordance with embodiments of the invention.
Figure 25:
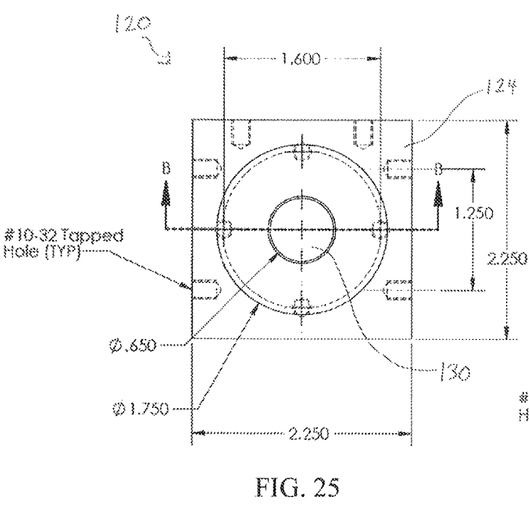
FIG. 25 is a bottom view of an exemplary embodiment of a receiver plate, in accordance with embodiments of the invention.
Figure 26:
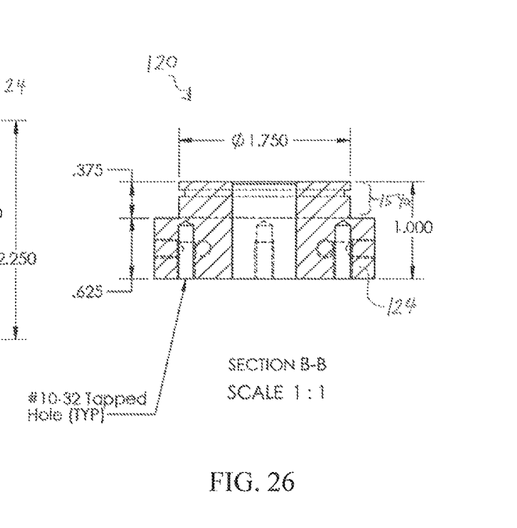
FIG. 26 is a cross sectional elevation view along line B-B of FIG. 25 of an exemplary embodiment of a receiver plate, in accordance with embodiments of the invention.
Figures 27, 28:
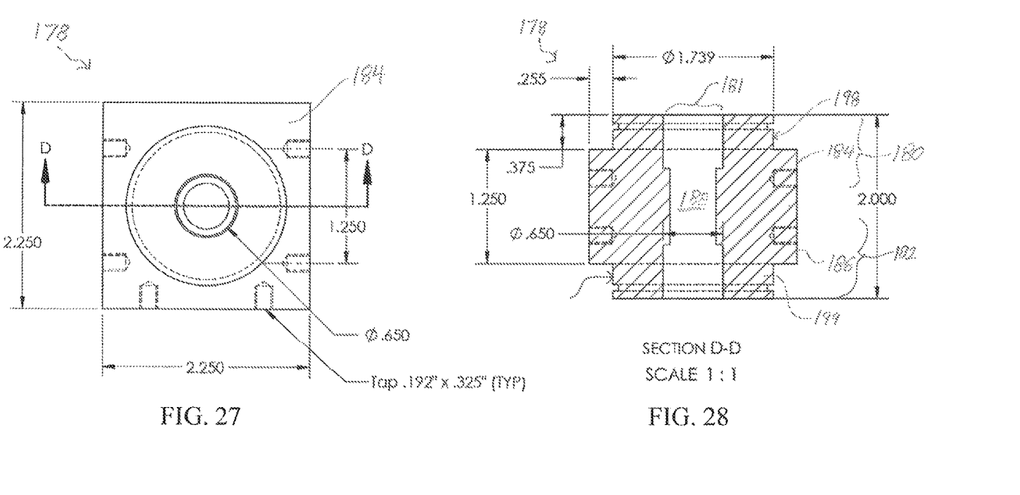
FIG. 27 is a top view of an exemplary embodiment of an inter-connector block, in accordance with embodiments of the invention.
FIG. 28 is a cross sectional elevation view along line D-D of FIG. 27 of an exemplary embodiment of an inter-connector block, in accordance with embodiments of the invention.
Figure 29:
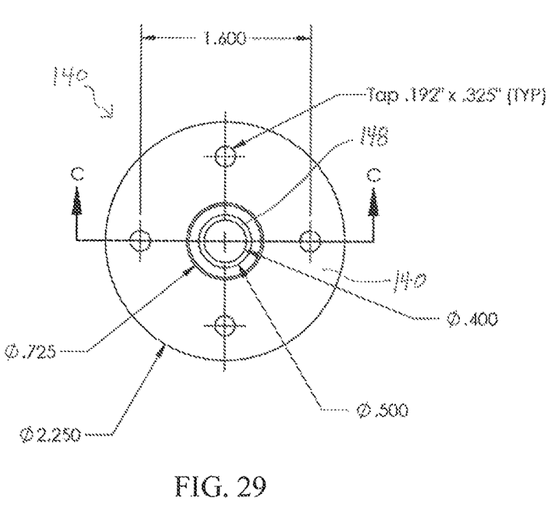
FIG. 29 is a top view of an exemplary embodiment of a connector plate, in accordance with embodiments of the invention.
Figure 30:
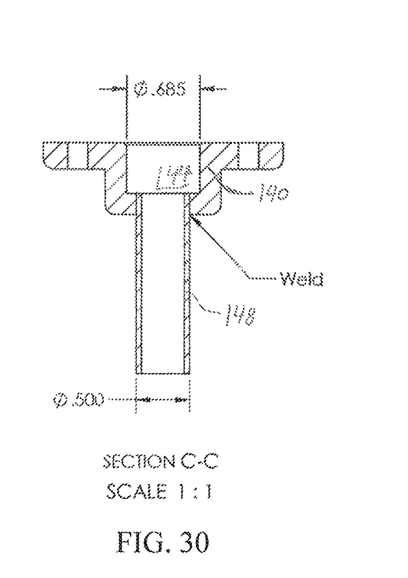
FIG. 30 is a cross sectional elevation view of an exemplary embodiment of a connector plate, including a connector plate nozzle, in accordance with embodiments of the invention.
Figures 31, 32, 33, 34, 35A:
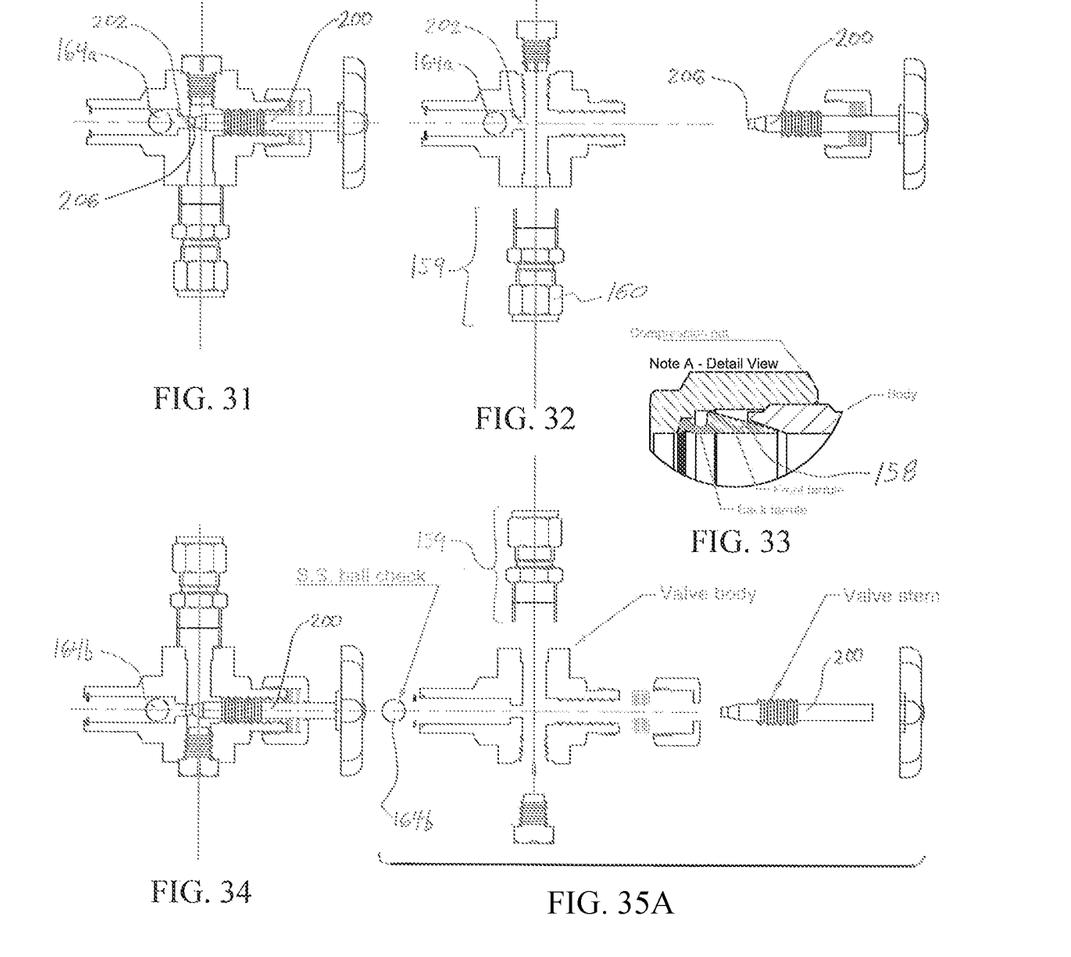
FIG. 31 is a cross sectional elevation view of an exemplary embodiment of a top needle valve with ball check assembly, in accordance with embodiments of the invention.
FIG. 32 is an exploded elevation view of an exemplary embodiment of a top needle valve with ball check assembly, in accordance with embodiments of the invention.
FIG. 33 is a detail view of an exemplary embodiment of a high pressure union fitting welded to a needle valve, in accordance with embodiments of the invention.
FIG. 34 is a cross sectional elevation view of an exemplary embodiment of a bottom needle valve with ball check assembly, in accordance with embodiments of the invention.
FIG. 35A is an exploded elevation view of an exemplary embodiment of a bottom needle valve with ball check assembly, in accordance with embodiments of the invention.
Figure 35B:
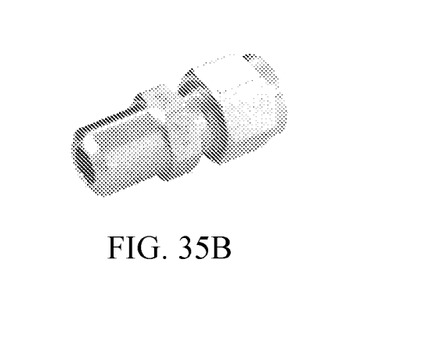
FIG. 35B is perspective view of an exemplary high pressure union fitting, in accordance with embodiments of the invention.
Figure 36:
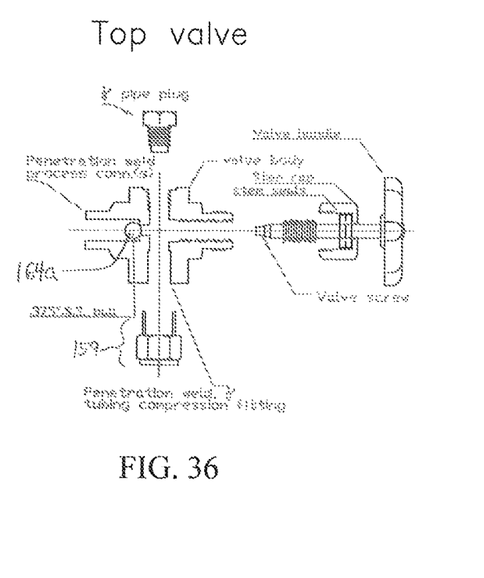
FIG. 36 is an exploded elevation view of an exemplary embodiment of a top needle valve with ball check assembly, in accordance with embodiments of the invention.
Figure 37:
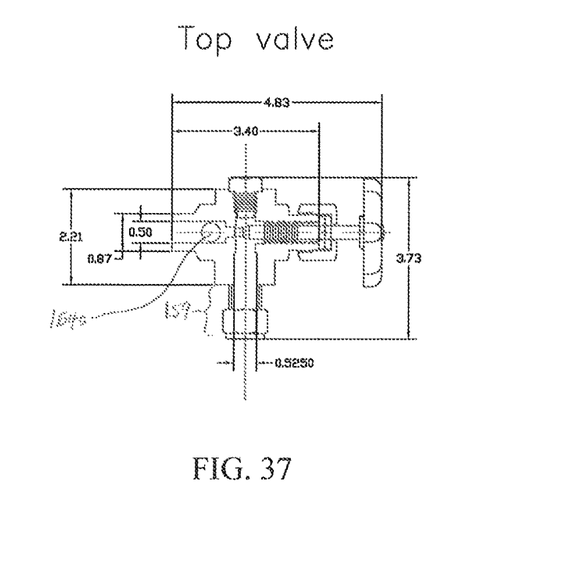
FIG. 37 is a cross sectional elevation view of an exemplary embodiment of a top needle valve with ball check assembly, in accordance with embodiments of the invention.
Figure 38:
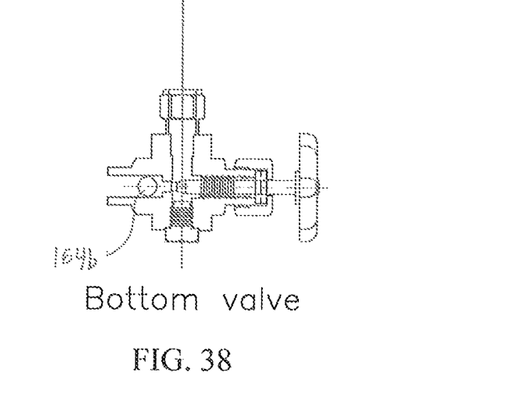
FIG. 38 is a cross sectional elevation view of an exemplary embodiment of a bottom needle valve with ball check assembly, in accordance with embodiments of the invention.
Figure 39:
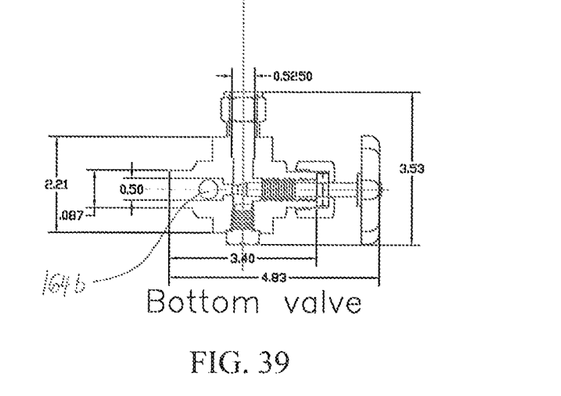
FIG. 39 is a cross sectional elevation view of an exemplary embodiment of a bottom needle valve with ball check assembly, in accordance with embodiments of the invention.

Referring to FIG. 15, the illustrated gauge 170 is suitable for applications below 8 feet, in accordance with preferred embodiments of the invention.

Referring to FIG. 14, in another embodiment, preferably, the illustrated gauge 170 is suitable for applications requiring a gauge of 8 feet or more in length. Referring to FIGS. 3 and 14, in such embodiments, the gauge 170 preferably includes a first elongated cylindrical transparent sight tube shield 108 and a second elongated cylindrical transparent sight tube shield 172, each shield having respective first ends 110 and 174 opposite respective seconds ends 112 and 176. In such embodiments, a single sight tube 114 extends through the first and second sight tube shields 108 and 172. In another embodiment, there is provided first and second sight tubes 114 and 115, each having first ends 116 and 117 opposite second ends 118 and 119, and each extending through the sight tube shields 108 and 172.

As illustrated in FIGS. 3, 14, and 27-28, an inter-connector block 178 is provided, and the inter-connector block 178 has a first block end 180 opposite a second block end 182, and each block end 180, 182 preferably has respective rectangular exterior surfaces 184 and 186 adapted for rigid connection to a U-shaped guard member 128. Preferably, inter-connector block 178 is fabricated with 316 stainless steel.

Exemplary preferred dimensions of embodiments of the inter-connector block 178 are illustrated in FIGS. 3, 5, 7, 14, 16-18, and 27-28. In some embodiments, the guard member 128 is C-shaped or another shape substantially formed to enclose the sight tube shields 108 and 172, and the block ends 180 and 182 are shaped respectively to receive the guard member 128. Preferably, the guard 128 rigidly attaches to the inter-connector block ends 180 and 182 by socket head screws 196. Preferably, the first block end 180 defines a first opening 181 therein to receive and secure the second end 118 of the first sight tube 114. Preferably, the second block end 182 defines a second opening 183 therein to receive and secure the first end 117 of the second sight tube 115. Accordingly, the inter-connector block 178 thereby enables sealed fluid communication between the first and second sight tubes 114 and 115.

In one embodiment, the inter-connector block 178 defines a passage 188 wherein the sight tube 114 extends through the passage.

Referring to FIGS. 3, 5, 7, 14, 16-18, and 27-28, in a preferred embodiment, the first block end 180 sealably receives the second end 110 of the first shield 108, and the second block end 182 sealably receives the first end 174 of the second shield 172, serving to seal the respective ends of each shield 108 and 172. In one embodiment, the armored sight level gauge 100 includes at least one O-ring 152c positioned around a cylindrical portion 198 of the first block end 180, wherein the cylindrical portion 198 of the first block end 180 is configured to tightly fit within the interior passage 134 of the sight tube shield 108 and compress the O-ring 152c between the cylindrical portion 198 of the first block end 180 and the interior passage 134 of the sight tube shield 108, creating a seal at the second end 110 of the sight tube shield 108. Similarly, in one embodiment, the armored sight level gauge 100 includes at least one O-ring 152d positioned around a cylindrical portion 199 of the second block end 182, wherein the cylindrical portion 199 of the second block end 182 is configured to tightly fit within the interior passage 134 of the sight tube shield 108 and compress the O-ring 152d between the cylindrical portion 199 of the second block end 182 and the interior passage 134 of the sight tube shield 108, creating a seal at the first end 174 of the second sight tube shield 172.

Preferably, the gauge 170 further includes a first receiver plate 120 and a second receiver plate 122, each receiver plate having a body with respective rectangular exterior surfaces 124 and 126 adapted for rigid connection to a U-shaped guard member 128. In embodiments where the guard member 128 is shaped other than in a U-shape, the surfaces 124 and 126 are shaped to mate with the guard member 128. Preferably, the guard 128 rigidly attaches to the receiver plates 120 and 122 by socket head screws 196.

Each receiver plate defines passages 130 and 132 wherein the sight tubes 114 and 115 extend through the passage. The first receiver plate 120 sealably receives first end 110 of the first shield 108 and the second receiver plate 122 sealably receives the the second end 176 of the second shield 172, serving to seal the respective ends of each shield. The gauge 170 further includes a first elongated U-shaped guard member 128 and a second elongated U-shaped guard member 190. The first guard member 128 has a first end 136 removably connected to the first receiver plate 120 and a second end 138 removably connected to the inter-connector block 178. The second guard member 190 has a first end 192 removably connected to the inter-connector block 178 and a second end 194 removably connected to the second receiver plate 122. Preferably, the guard members 128 and 190 provide a structural protective enclosure substantially enclosing the sight tube shields 108 and 172 and the sight tubes 114 and 115, the guard members 128 and 190 serving to structurally protect and support the shields 108 and 172.

Referring to FIGS. 2-4, 8-9, 14-15, and 19-20, preferably, a first connector plate 140 and a second connector plate 142 are included, each connector plate defining respective openings 144 and 146 therein to respectively receive and secure the first and second ends 116 and 118 of the sight tube 114 for fluid communication between the sight tube 114 and the fittings 102 and 104.

The first connector plate 140 preferably defines an opening 144 therein to respectively receive and secure the first end 116 of the first sight tube 114, the second connector plate 142 defines an opening 146 therein to respectively receive and secure the second end 119 of the second sight tube 115 for fluid communication between said sight tubes and the fittings.

Each connector plate 140 and 142 preferably includes respective nozzles 148 and 150 extending therefrom, opposite the openings 144 and 146. In a preferred embodiment, each connector plate 140 and 142 is in coaxial alignment with the sight tubes 114 and 116, each nozzle 148 and 150 positionable between and removable from the spaced apart fittings 102 and 104.

As illustrated in FIGS. 1 and 40, the armored sight level gauge field assembly 100 is preferably assembled between first and second spaced apart fittings 102 and 104 to show liquid level 106. Referring to FIGS. 31-66, preferably, the first need valve 162 includes an integral ball check 164 and a threaded needle-shaped plunger 200 on the end of a screw. Preferably, the needle valve defines a relatively small orifice 202 with a long, tapered seat 204. A tip 206 of the needle-shaped plunger 200 precisely fits the seat. The valve screw plunger 200 allows precise regulation of flow.

In one embodiment, the invention disclosed herein is a novel mechanical, armored, sight level gauge 100 designed to allow a full protection level gauge externally mounted to a liquid tank 101 that can be field assembled or factory assembled to fit the required length of tank level to be monitored. Preferably, assemblies including metal parts are constructed of 316L stainless steel. Seals and o-rings are preferably Viton, Buna, or Teflon encapsulated silicone, depending on the liquid service and tank requirements. The valves 102 and 104 are preferably mounted to the top and bottom of the tank 101. In one embodiment, the gauge 100 is mounted to needle valves 162 and 164 having integral ball check valves. In operation, liquid passes through the valves 102 and 104 mounted on the tank 101 and into the high pressure glass sight tube 114 by gravity. Preferably, the glass sight tube 114 is made from Pyrex or a similarly impact-resistant, transparent material. The gauge 100 provides additional protection with a sight tube shield 108, preferably a polycarbonate round shield, around the sight tube 114, and an elongated guard member 128, preferably manufactured of 16 gauge 316L stainless shield, providing additional protection to 3 sides of the level gauge 100. The stainless steel gauge housing 128 preferably has small hole perforations 168 over the entire surface for allowing light into the gauge housing 100.

TABLE 1

Exemplary Size and Pressure Ratings.

| Length in Inches | Max Working Pressure @ 150° F. |
| --- | --- |
| 8 | 370 |
| 10 | 345 |
| 12 | 335 |
| 14 | 325 |
| 16 | 315 |
| 18 | 305 |
| 20 | 290 |
| 24 | 265 |
| 30 | 235 |
| 36 | 205 |
| 48 | 165 |
| 60 | 125 |
| 72 | 90 |
| 84 | Ambient/Atmospheric |
| 96 | Ambient/Atmospheric |

TABLE 2

Exemplary Model Code Logic for embodiments disclosed herein is as follows:

| Position | Code | Description |
| --- | --- | --- |
| 1: Sight Level Gauge | SLG | |
| 2: Process Connection | M50 | ½" MNPT |
| | M75 | ¾" MNPT |
| | M100 | 1" MNPT |
| | F50 | ½" 150 lb FR. Flange |
| | F75 | ¾" 150 lb FR. Flange |
| | F100 | 1" 150 lb FR. Flange |
| | F150 | 1½" 150 lb FR. Flange |
| | F200 | 2" 150 lb FR. Flange |
| | F250 | 2½" 150 lb FR. Flange |
| 3: Center to Center | X | Center to Center Dimension (inches) 8" to 96" |
| 4: Seal Material | V | Fluorocarbon |
| | B | Bruna-N |
| | T | FEP Encapsulated Silicone |
| | E | Ethylene Propylene |
| 5: Tank PSI | X | Maximum Working Pressure (PSIG) |
| 6: Tank Temperature | X | Maximum Working Temperature (° F.) 200° F. MAX |
| 7: Options | H | Height Scale |
| | M | Metric Height Scale |
| | C | Custom Scale |

Referring to FIGS. 40-52 which illustrate exemplary gauge order logic as shown in Table 2, in accordance with embodiments of the invention. Exemplary dimensions of embodiments in accordance with Option 2: Process Connection as shown Table 2 above are illustrated in FIGS. 41-44 and 55-58. In one exemplary embodiment, the logic code model is SLG/M100/45/V/500/105/H.

In one embodiment, the sight level gauge field assembly 100 is an armored sight level gauge to be mounted to any liquid tank. Preferably, the assembly 100 includes a set of needle valves with integral ball check 162 and 166. Preferred embodiments include 4 ports with NPT and union compression fittings 159 for connections to the sight glass assembly 100. Exemplary union compression fittings 159, according to embodiments of the invention, are illustrated in FIGS. 31-32, 34-35, 45-46, and 59-60.

In yet another embodiment, the sight glass assembly 100 includes a set of valve receivers 140 and 142 and gauge housing connectors 120 and 122 mounted between the stainless steel perforated shield 128, the polycarbonate protective tube shield 108 and the ⅝" outer diameter high pressure glass sight tube 114.

In one embodiment, the gauge 100 allows a means to view tank levels 106 external to the tank 101 via the glass tube 114 inside of a protective housing 128. Valves 102 and 104 are preferably connected to the gauge housing 100 with the high pressure union compression fittings 159, allowing for the ability to rotate the face of the gauge 360 degrees, without disconnecting and removing the assembly 100 from the fittings 102 and 104. The novel design also allows for the gauge 100 to be field assembled or factory assembled to the required center to center dimensions, in accordance with embodiments disclosed herein.

In an exemplary configuration, the design of the gauge 100 is unique in the connection between the valves 102 and 104 and the gauge housing 128. Preferably, the connection is a tube union compression fitting 159 with a rating of 5,000 psig. The gauge housing 128 is also unique in its design of a 16 gauge stainless steel perforated, 3 sided shield guard 128, which provides protection for the polycarbonate tube shield 108 and the ⅝ inch high pressure glass sight tube 114 but allows light into the interior of the gauge housing 128 for better visibility of the liquid inside of the glass tube 114. Also unique is the ability to field assemble the embodiments to the required center to center dimension.

Advantages of this invention include the tube union compression fittings 159 between the gauge housing 128, the two levels of protection around the high pressure glass tube 114, which provides improved protection for the high pressure glass sight tube 114 and allows viewing from all angles.

All U.S. patents and publications identified herein are incorporated in their entirety by reference thereto.

The claimed invention is:

1. An armored sight level gauge field assembly for placement between first and second spaced apart fittings to show liquid level, comprising:
    an elongated cylindrical transparent sight tube shield having a first end opposite a second end;
    a sight tube having a first end opposite a second end, said sight tube extending through the sight tube shield;
    a first receiver plate and a second receiver plate, each receiver plate comprising a body having a rectangular exterior surface adapted for rigid connection to an elongated U-shaped guard member, each receiver plate defining a passage wherein the sight tube extends through the passage, each receiver plate sealably receiving respective first and second ends of the shield, serving to seal an interior of the shield;
    said elongated U-shaped guard member having a first end removably connected to the first receiver plate and having a second end removably connected to the second receiver plate, said elongated U-shaped guard member providing a structural protective enclosure substantially enclosing the sight tube shield and the sight tube, said elongated U-shaped guard member serving to structurally protect and support the shield; and
    a first connector plate and a second connector plate, each connector plate defining an opening therein to respectively receive and secure said first and second ends of the sight tube for fluid communication between said sight tube and the fittings, each connector plate comprising a nozzle extending therefrom, opposite said opening, in coaxial alignment with said sight tube, each said nozzle positionable between and removable from said spaced apart fittings.

2. The armored sight level gauge of claim 1, further comprising an O-ring positioned around a cylindrical portion of the first receiver plate, wherein the cylindrical portion of the first receiver plate is configured to fit within the interior passage of the sight tube shield and compress the O-ring between the cylindrical portion of the first receiver plate and the interior passage of the sight tube shield, creating a seal.

3. The armored sight level gauge of claim 1, further comprising at least one O-ring positioned around the first end of the sight tube, wherein the at least one O-ring is positioned to compress and form a seal between the first connector plate and the first receiver plate upon the attachment of the first connector plate and the first receiver plate.

4. The armored sight level gauge of claim 1, further comprising a ferrule disposed on an end of a nozzle of the connector plate, wherein the nozzle is configured for insertion into a valve to form a seal.

5. The armored sight level gauge of claim 1, further comprising a first valve with an integral ball check and a second valve with an integral ball check, wherein the first valve is configured to attach to the first connector plate and the second valve is configured to attach to the second connector plate, wherein fluid communication is enabled with the interior passage of the sight tube.

6. The armored sight level gauge of claim 1, further comprising a first needle valve with an integral ball check and a second needle valve with an integral ball check, wherein the first needle valve is configured to attach to the first connector plate and the second needle valve is configured to attach to the second connector plate, wherein fluid communication is enabled with the interior passage of the sight tube.

7. The armored sight level gauge of claim 1, wherein the elongated U-shaped guard member has perforations to allow light into the gauge.

8. An armored sight level gauge field assembly for placement between first and second spaced apart fittings to show liquid level, comprising:
an elongated cylindrical transparent sight tube shield having a first end opposite a second end;
a sight tube having a first end opposite a second end, said sight tube extending through the sight tube shield;
a first receiver plate and a second receiver plate, each receiver plate comprising a body having a rectangular exterior surface adapted for rigid connection to an elongated guard member, each receiver plate defining a passage wherein the sight tube extends through the passage, each receiver plate sealably receiving respective first and second ends of the shield, serving to seal an interior of the shield;
said elongated guard member having a first end removably connected to the first receiver plate and having a second end removably connected to the second receiver plate, said guard member providing a structural protective enclosure substantially enclosing the sight tube shield and the sight tube, said elongated guard member serving to structurally protect and support the shield; and
a first connector plate and a second connector plate, each connector plate defining an opening therein to respectively receive and secure said first and second ends of the sight tube for fluid communication between said sight tube and the fittings, each connector plate comprising a nozzle extending therefrom, opposite said opening, in coaxial alignment with said sight tube, each said nozzle positionable between and removable from said spaced apart fittings.

9. The armored sight level gauge of claim 8, wherein the elongated guard member is C-shaped.

10. An armored sight level gauge field assembly for placement between first and second spaced apart fittings to show liquid level, comprising:
a first elongated cylindrical transparent sight tube shield and a second elongated cylindrical transparent sight tube shield, each shield having a first end opposite a second end;
a sight tube having a first end opposite a second end, said sight tube extending through said first sight tube shield and said second sight tube shield;
an inter-connector block having a first block end opposite a second block end, each block end having a rectangular exterior surface adapted for rigid connection to a first elongated U-shaped guard member and a second elongated U-shaped guard member, the first block end defining a first opening therein to receive and secure the second end of the first sight tube shield, the second block end defining a second opening therein to receive and secure the first end of the second sight tube shield, the first block end sealably receiving the second end of the first shield, the second block end sealably receiving the first end of the second shield, serving to seal the respective ends of each shield;
a first receiver plate and a second receiver plate, each receiver plate comprising a body having a rectangular exterior surface adapted for rigid connection to the first elongated U-shaped guard member and the second elongated U-shaped guard member, respectively, each receiver plate defining a passage wherein the sight tube extends through the passages, the first receiver plate sealably receiving the first end of the first shield, the second receiver plate sealably receiving the second end of the second shield, serving to seal the respective ends of each shield;
said first elongated U-shaped guard member and said second elongated U-shaped guard member, the first elongated U-shaped guard member having a first end removably connected to the first receiver plate and a second end removably connected to the inter-connector block, the second elongated U-shaped guard member having a first end removably connected to the inter-connector block and a second end removably connected to the second receiver plate, said first and second elongated U-shaped guard members providing a structural protective enclosure substantially enclosing the sight tube shields and the sight tube, said first and second elongated U-shaped guard members serving to structurally protect and support the shields; and
a first connector plate and a second connector plate, the first connector plate defining an opening therein to respectively receive and secure said first end of the sight tube, the second connector plate defining an opening therein to respectively receive and secure the second end of the second sight tube for fluid communication between the fittings, each connector plate comprising a nozzle extending therefrom, opposite said opening, in coaxial alignment with said sight tube, each said nozzle positionable between and removable from said spaced apart fittings.

11. The armored sight level gauge of claim 10, wherein the single sight tube extends from the first connector plate to the second connector plate, extending through the inter-connector block.

* * * * *